Aug. 30, 1932.  A. W. BRUCE  1,875,172
LATERAL MOTION DEVICE FOR LOCOMOTIVES
Filed Aug. 15, 1930
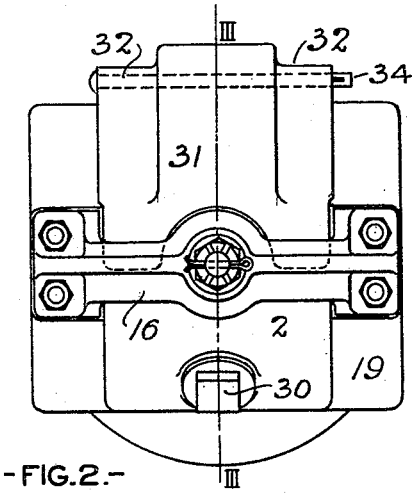
-FIG.2.-
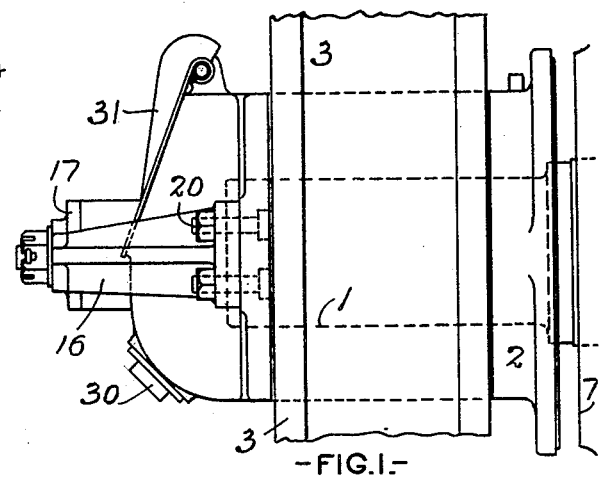
-FIG.1.-
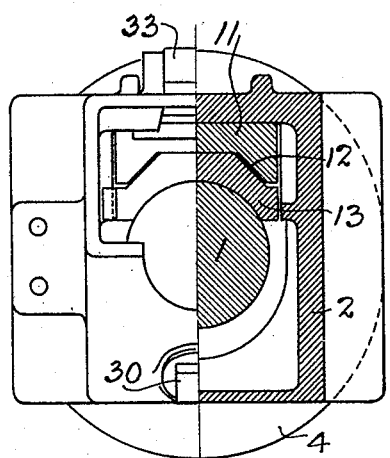
FIG. 4.-
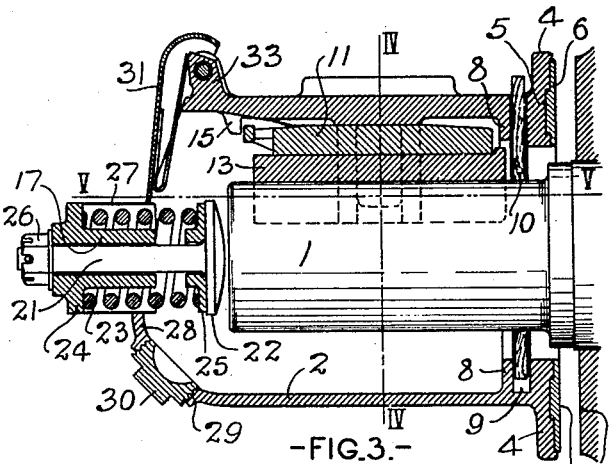
-FIG.3.-
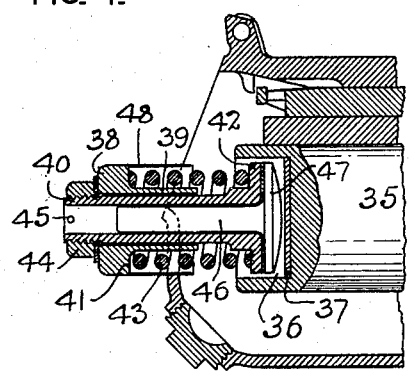
-FIG.6.-
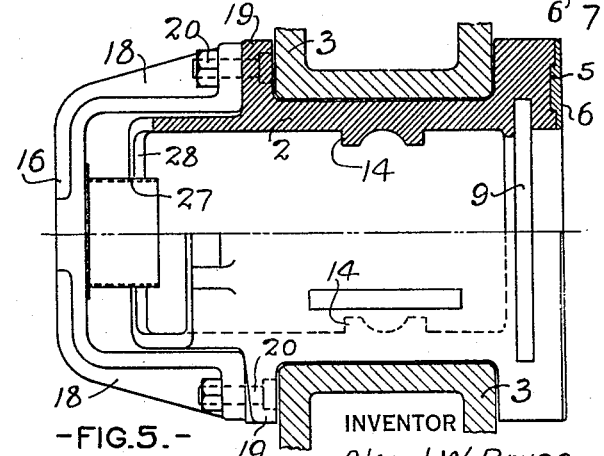
-FIG.5.-
INVENTOR
Alfred W. Bruce
BY
S. O. Yeaton
ATTORNEY Patented Aug. 30, 1932

1,875,172

UNITED STATES PATENT OFFICE

ALFRED W. BRUCE, OF NEW YORK, N. Y.

LATERAL MOTION DEVICE FOR LOCOMOTIVES

Application filed August 15, 1930. Serial No. 475,457.

This invention relates to lateral motion devices for locomotives, and more particularly to such devices in their application to trailing trucks, such for instance as the four wheel type.

Such trucks are used to support the back end of a locomotive with the capacity for supporting a booster motor or analogous device in the usual manner, if desired. The increased carrying capacity of the four wheel truck over that of a two wheel truck is attained, by virtue of the additional axle and pair of wheels, and the increase in friction between the wheel flanges and the rails when the truck passes over curved track may be substantially decreased by affording one of the axles and its wheels a limited amount of lateral motion. A truck of this character has been described and claimed in U. S. Reissue Letters Patent #16,451, granted to me, November 2nd, 1926.

The object of the present invention is to provide an improved means for permitting the aforesaid lateral movement and effecting an adjustment of the axle to its normal position after the curved section of track has been passed over, which means will be efficient in its operation and of simple yet durable construction.

It will be understood that while the device of this invention is especially applicable to trailing trucks of various types, it likewise may be used in various other capacities where provision for the lateral motion of an axle and its wheels is efficacious; and that all and any changes in the details of the embodiment of the invention exemplified herein, which may prove desirable and will be apparent to those skilled in the art, are contemplated by me as within the spirit and scope of my invention.

In the accompanying drawing; Figure 1 is a side elevation of a journal box with the invention applied thereto showing part of a pedestal for retaining the same; Fig. 2 is an end view of the same; Fig. 3 is a longitudinal section taken on the line III—III of Fig. 2; Fig. 4 on the left side is an end view with the box cover and yoke removed and on the right side is a section taken on the line IV—IV of Fig. 3; Fig. 5 is at its top half a horizontal section on the line V—V of Fig. 3, and its bottom half is a plan view of the parts shown in Fig. 1; and, Fig. 6 is a sectional view similar to Fig. 3, showing a modification of the invention.

In the practice of my invention, referring in detail to the drawing, the axle journal 1, rotates in the journal box 2, which is secured to the truck frame by suitable means such as pedestals 3.

In the manner generally known in the art, the inner end of the journal box is left open to receive the journal 1, and is formed with a flange 4. A groove 5 is formed in the outer side of the flange in which is mounted a wearing face 6, of a suitable bearing metal, for the hub face 7 of a wheel mounted on the axle. An inwardly projecting flange 8 is spaced from the inner side of the flange 4 providing a groove 9 around the sides of the journal box, in which groove a dust guard 10, is held. The dust guard 10, surrounds the axle journal and acts to protect the interior of the box from dust or foreign matter. A wedge 11 is disposed beneath the upper side of the journal box and a longitudinal groove 12 is formed along the bottom of the same. A bearing 13 of suitable material such as brass or bronze, and provided with an upwardly extending flange on its inner end, is disposed above the axle journal, its upper part being wedge-shaped and engaging the groove 12 of the wedge. The bearing 13 is held against inward lateral motion in the usual manner by projections 14 formed on the inner walls of the journal box. The flange, on the inner end of the bearing 13, and a lug 15 projecting from the upper journal box wall serve to hold the wedge 11 in lateral position and to permit its removal from the box when the latter is raised, the flange on the inner end of the bearing serving to retain the bearing against outward movement.

Referring now to the preferred embodiment of the present invention:

At the outer end of the journal box a yoke 16 is provided comprising a sleeve member 17 and arms 18 formed integrally therewith. The ends of the arms 18 are secured to flanges 19 formed on the journal box, by the bolts 20. A plunger 21 is disposed in the sleeve 17, so that a head 22, on its inner end, is positioned adjacent the end of the journal 1. A spring 23 is mounted around the sleeve 17, its outer end bearing on a flange 24 formed integrally with the sleeve, and its inner end bearing on a washer 25 disposed on the plunger 21 at the inner side of its head 22. A castle nut 26 is fixed to the outer end of the plunger so that while the latter is free for rotatable and outward lateral movement, within the sleeve, from its normal position, shown in Fig. 3, the castle nut will restrict it from any inward movement therefrom and will also serve to hold the plunger against the spring at a suitable normal tension. A casing 27 is mounted on the sleeve 17, surrounding the spring 23, the casing being rigidly secured to said sleeve by suitable means such as spot welding (not shown).

The outer end of the journal box is provided with a wall 28 formed with a central depression to receive spring casing 27. The lower portion of the wall is provided with a port 29, in which a removable plug 30 is fitted to permit the draining of the journal box of oil or the cleaning of the same. In the upper part of the wall 28 a cover 31 is provided, to give access to the interior of the box. The cover 31 is hingedly connected to the journal box by means of lugs 32 and 33 formed on said cover and journal box respectively, and a pin 34 passed through longitudinally aligned bores formed in said lugs, the lower end of the cover being shaped to fit around the upper side of the inner end of the spring casing 27.

It will be apparent that in the operation of a truck where this invention is applied as aforedescribed, upon passing over a curved section of track, the laterally adjustable axle, of the truck will be permitted to move a predetermined distance, as indicated by the space between the wearing face 6 on the box and the hub face 7, this distance being sufficient to allow the wheels to pass over the curved track while substantially decreasing the friction caused thereby between their flanges and the rails. Upon such lateral movement the plunger 21 which is disposed in the journal box on that side of the truck toward which the axle is laterally moved, will be forced outward by the end of the axle against the tension of the spring 23, the plunger being free however, for such revolving motion as the journal will tend to transmit thereto. After the truck has passed over the curved section of track, the exertion of the tension force of the spring 23 against the head 22 of the plunger 21, will cause the latter to adjust the axle back to its normal position.

In Fig. 6, which illustrates a modified form of the invention, the end of the journal 35 is formed with a recess 36 and a wearing plate 37 is mounted in the said recess. A yoke 38, similar to the yoke 16 is similarly mounted on the end of the journal box; the inner end of the box (not shown) and the wedge and bearing being identical in construction and position with those of Fig. 3. The yoke 38 comprises the sleeve 39, and an inner sleeve 40 is disposed within the sleeve 39, free to rotate and move longitudinally therein. A flange 41 is formed on the outer end of the sleeve 39 and a flange 42 is formed on the inner end of sleeve 40. A spring 43 is disposed around the sleeves, its outer end bearing against the flange 41 of the sleeve 39 and its inner end bearing against the flange 42 of the inner sleeve 40. A nut 44 is fixed to the outer end of the sleeve 40, being held fast by the pin 45 so as to restrict the inward movement of the sleeve 40 and hold the spring at a suitable normal tension. The plunger 46 is disposed in the inner sleeve 40 and has in this instance a stem which extends only part of the length of the sleeve. It is free to rotate and move laterally in the said sleeve, its head 47 being positioned within the recess 36 adjacent the wearing plate 37 of the journal. An outer casing 48 is provided for the spring 43. This modification is of particular value where it is important to conserve the space required by the outer end of the plunger shown in Fig. 3. Its operation is substantially the same as that of the design shown in Fig. 3, except that here, the plunger and inner sleeve move together in their lateral adjustment function.

The invention claimed and desired to be secured by Letters Patent is:

1. A journal box, a bearing therein for an axle journal adapted to permit lateral movement of the journal, a journal, an elongated sleeve member disposed in the end of said box, a plunger having a stem with its major portion disposed in said sleeve adapted for longitudinal movement therein, the inner end of said plunger being formed with a head positioned adjacent the end of said journal, a spring disposed around the outside of the sleeve, the inner portion of the spring and said stem extending beyond the inner end of the sleeve, said spring operably engaging said plunger and adapting the plunger to exert force against the end of the journal when the journal is laterally moved toward the plunger, and means disposed on the plunger stem to restrict the inward movement of the plunger and to hold the plunger in its normal engaging position with said resilient means.

2. Lateral motion equipment for a railway vehicle comprising an axle journal having a recess formed in its end, a journal box, a bearing in the box for the journal adapted to permit lateral movement of the journal, an outer sleeve member disposed in the end of said journal box, an inner sleeve disposed within the outer sleeve and free for longitudinal movement therein, a plunger disposed in said inner sleeve having a head portion extending into said recess, and resilient means operably engaging the inner sleeve whereby the said plunger is adapted to move laterally with said inner sleeve and to exert force on the end of the journal within the recess when the said journal is laterally moved toward the plunger.

3. Lateral motion equipment for a railway vehicle comprising an axle journal having a recess formed in its end, a journal box, a bearing in the box for the journal adapted to permit lateral movement of the journal, an outer sleeve member disposed in the end of said journal box adjacent the end of said journal, an inner sleeve disposed within the outer sleeve and free for longitudinal movement therein, radially extending flanges formed on the outer end and inner end of the outer and inner sleeves respectively, a spring member having one of its ends bearing on the flange of the outer sleeve and the other end bearing on the flange of the inner sleeve, a headed plunger disposed within the inner sleeve, the head of said plunger being positioned between the flange of the said inner sleeve and the end of the journal within the said recess, whereby upon lateral movement of said journal toward the plunger the inner sleeve and said plunger will be forced outwardly against the said spring and the tension force of said spring will be exerted through said inner sleeve and plunger against the end of the said journal within said recess to return the said journal to its normal position.

4. Lateral motion equipment for a railway vehicle comprising an axle journal having a recess formed in its end, a journal box, a bearing in the box for the journal adapted to permit lateral movement of the journal, an outer sleeve member disposed in the end of said box adjacent the end of said journal, an inner sleeve disposed within the outer sleeve and free for longitudinal movement therein, radially extending flanges formed on the outer end and inner end of the outer and inner sleeves respectively, a spring member mounted around said sleeves having one of its ends bearing on the flange of the outer sleeve and the other end bearing on the flange of the inner sleeve, and a plunger disposed within the inner sleeve, having a head disposed between the flange of the said inner sleeve and the end of the journal within said recess whereby upon lateral movement of said journal toward the plunger the said plunger and inner sleeve will be forced outwardly against the said spring and the tension force of said spring will be exerted against the said end of the journal to return the journal to its normal position, and means secured to the outer end of the said inner sleeve to restrict its inner longitudinal movement and to hold said inner sleeve in normal adjusted position against the spring member.

5. In a locomotive, the combination of an axle journal having a recess in its outer end; a journal box therefor, having its outer end partially open; a hinged cover closing said opening; a plunger support, rigidly secured to the outer end of the box and projecting outwardly beyond said end and cover; a plunger carried by the support, having its inner end disposed within said recess of the journal and having its outer end extending through the outer end of the support; and a spring urging the plunger toward the journal and adapting the plunger to exert force against the journal within said recess when the journal is laterally moved toward the plunger.

6. In a locomotive, the combination of an axle journal having a recess in its outer end; a journal box therefor, having its outer end partially open; a hinged cover closing said opening; a plunger support rigidly secured to the outer end of the box and projecting outwardly beyond said end and cover; a plunger carried by the support, having its inner end disposed within the recess of the journal and having its outer end extending through the outer end of the support; a spring urging the plunger toward the journal and adapting the plunger to exert force against the journal within said recess when the journal is laterally moved towards the plunger; and means on the outer end of said plunger for adjusting the tension of the spring.

7. In a locomotive, the combination of an axle journal having a recess in its outer end; a journal box therefor having its outer end partially open; a hinged cover closing the opening; a plunger support rigidly secured to the outer end of the box and projecting outwardly beyond said end and cover; a plunger carried by the support, having its inner end disposed within the said recess in the end of the journal, and having its outer end extending through the outer end of the support; and a spring urging the plunger to exert force against the journal within the said recess, when the journal is laterally moved toward the plunger.

8. In a locomotive, the combination of an axle journal box; a journal having a recess in its outer end and disposed within said box, with the capacity for limited lateral movement relative to said box; and a lateral movement resistance device comprising a member rigidly supported by the box, means having an inner end part disposed within the recess in the outer end of the journal to coact with the journal to be moved outwardly thereby when the journal moves outwardly, a part adapted to yieldingly resist said movement backed by said rigidly supported member, and means for holding said yielding means under tension and inactive during normal position of the journal, said holding means being adjustable to vary the said tension.

ALFRED W. BRUCE.